No. 749,554. PATENTED JAN. 12, 1904.
C. E. GRIFFIN & H. A. LOW.
FENCE POST AND ELECTRICAL CONDUCTOR.
APPLICATION FILED AUG. 11, 1903.
NO MODEL.
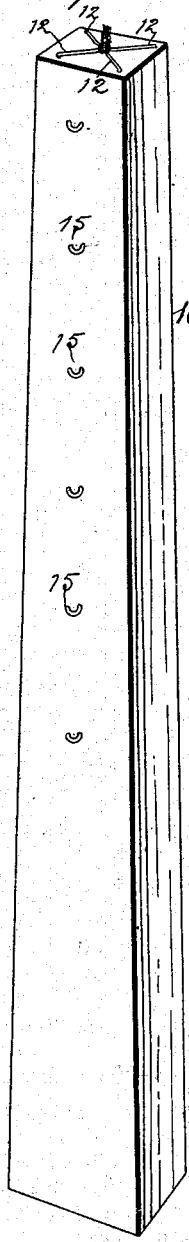
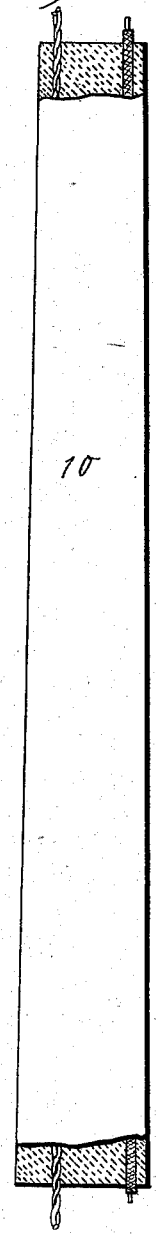
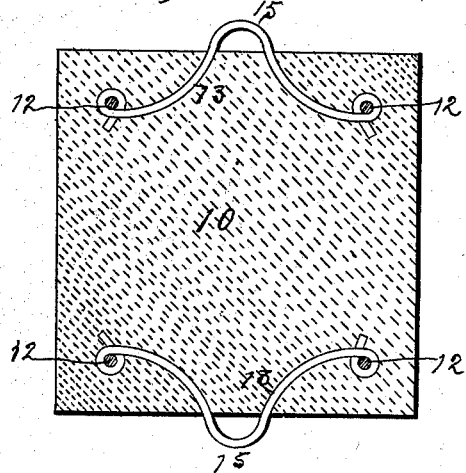
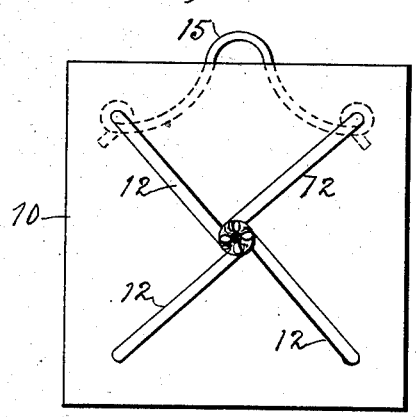
Witnesses:
L. L. Heibrock.
S. F. Christy.
Inventors: Charles E. Griffin
and Harold A. Low,
By Thomas G. Orwig, Attorney.

No. 749,554. Patented January 12, 1904.

UNITED STATES PATENT OFFICE.

CHARLES E. GRIFFIN, OF SAC CITY, AND HAROLD A. LOW, OF LAKE CITY, IOWA.

FENCE-POST AND ELECTRICAL CONDUCTOR.

SPECIFICATION forming part of Letters Patent No. 749,554, dated January 12, 1904.

Application filed August 11, 1903. Serial No. 169,160. (No model.)

*To all whom it may concern:*

Be it known that we, CHARLES E. GRIFFIN, residing at Sac City, in the county of Sac, and HAROLD A. LOW, residing at Lake City, in the county of Calhoun, State of Iowa, citizens of the United States, have invented a new and useful Fence-Post and Electrical Conductor, of which the following is a specification.

Our object is to provide a simple, cheap, and durable solid fence-post well adapted for the purpose of making wire fence and also adapted to serve as an electric conductor during rain-storms, as required, to protect persons or animals near a fence from strokes of lightning.

Our invention consists in a post made of sand and cement and wires extended therethrough longitudinally and connected by wires extended transversely to produce loops for fastening fence-wires thereto, as hereinafter set forth, pointed out in our claims, and illustrated in the accompanying drawings, in which—

Figure 1 is a perspective view of a complete post ready for use in which four single lengths of wire are extended and connected at their ends. Fig. 2 is a side view of a post in which an insulated wire is shown and also two strands of wire twisted together. Fig. 3 is an enlarged transverse sectional view that shows how the longitudinal wires are connected by short pieces of wire to produce loops on the exterior adapted for fastening fence-wires thereto. Fig. 4 is a bottom view of the post and shows how the four wires embedded in the post are connected to terminate in the center.

The numeral 10 designates a composition post made of sand and cement in a suitable molding-flask. It may vary in shape and size and weight, as desired. Four wires 12 are extended through the flask and the composition filled in around them to embed them and when hardened to hold them fast in the post to aid in preventing the post from breaking off at any point along its length.

To produce loops on the exterior of the side of the post for fastening fence-wires thereto, short pieces of wire 13 are coiled around the wires 12 and then bent outward to project outside of the post in the form of loops 15 and to act as electric contact-points when fence-wires are connected therewith, so that when lightning-currents strike the fence-wires the currents will be conveyed by the short wires 13 and transmit the currents to the wires 12, that extend through the posts into the ground. It is obvious the loops 15 may be on one or both sides of the post. It is also obvious that if the composition is not a sufficient non-conductor of electricity the wires may be insulated. It is also obvious several strands may be twisted together and more securely fastened in the composition than single strands.

The ends of the wires 12 are twisted together at the top and bottom of the post, so they will act jointly as electric points for the conductors.

Having thus set forth the purpose of our invention and its construction and operation, its practical utility will be readily understood by persons familiar with the art to which it pertains; and

What we claim as new, and desire to secure by Letters Patent, is—

1. As a new article of manufacture, a solid composition post having electric-wire conductors embedded therein to extend longitudinally from end to end and their ends projected beyond the ends of the post and connected to produce conductor-points, and means for electrically connecting fence-wires with said embedded electric-wire conductors for the purpose stated.

2. An electric conductor consisting of a solid post made of plastic composition and wires extended therethrough longitudinally and their ends connected to produce conductor-points extending beyond the ends of the post and short pieces of wire fastened at their ends to the longitudinal wires inside of the post and their centers projected outside of the posts in the form of loops for connecting fence-wires therewith.

CHARLES E. GRIFFIN.
HAROLD A. LOW.

Witnesses:
J. B. SMITH,
C. A. LOW.